(12) United States Patent
Busshart et al.

(10) Patent No.: US 6,760,732 B2
(45) Date of Patent: Jul. 6, 2004

(54) METHOD AND SYSTEM FOR VIEWING A RECORD OF AN ORGANIZATION HAVING A HIERARCHY OF DEPARTMENTS

(75) Inventors: Leonard R. Busshart, Vestal, NY (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/947,837

(22) Filed: Sep. 6, 2001

(65) Prior Publication Data

US 2003/0046295 A1 Mar. 6, 2003

(51) Int. Cl.[7] .............................................. G06F 17/00
(52) U.S. Cl. ...................... 707/101; 707/102; 715/514
(58) Field of Search ............................... 707/1–6, 100, 707/101, 104.1, 102; 705/1; 715/514

(56) References Cited

U.S. PATENT DOCUMENTS

| | | | | |
|---|---|---|---|---|
| 4,383,298 A | * | 5/1983 | Huff et al. ..................... | 705/28 |
| 5,467,440 A | | 11/1995 | Nihei | |
| 5,829,003 A | | 10/1998 | Okura | |
| 6,072,493 A | | 6/2000 | Driskell et al. | |
| 6,101,479 A | | 8/2000 | Shaw | |
| 6,119,097 A | * | 9/2000 | Ibarra .......................... | 705/11 |
| 6,125,354 A | | 9/2000 | MacFarlane et al. | |
| 2002/0035506 A1 | * | 3/2002 | Loya ............................ | 705/14 |
| 2003/0004967 A1 | * | 1/2003 | Calderaro et al. ........ | 707/104.1 |
| 2003/0036927 A1 | * | 2/2003 | Bowen ........................... | 705/4 |

FOREIGN PATENT DOCUMENTS

JP 7182411 A2 7/1995

* cited by examiner

*Primary Examiner*—Uyen Le
(74) *Attorney, Agent, or Firm*—Ronald A. D'Alessndro; Hoffman, Warnick & D'Alessandro LLC

(57) ABSTRACT

A method and system for viewing a record of an organization having a hierarchy of departments is provided. Specifically, under the present invention, a record having data, a record department label and an optional identifier is received. The record is compared to an organizational table having entries that each include an organizational department label and a list of hierarchical levels. Based upon the comparison, an entry in the organizational table that corresponds to the record department label is identified. Once identified, the list of hierarchical levels from the identified entry is added to the record and a view of the record is generated. The view includes categorized columns of the added list of hierarchical levels and the optional identifier.

34 Claims, 6 Drawing Sheets

| DEPARTMENT | ORGANIZATION |
|---|---|
| BDYA | OILA MYERS YABLONSKY BDYA |
| CDS | OILA MYERS MYERS CDS |
| DSDS | OILA MYERS MYERS DSDS |
| OILA | OILA OILA OILA OILA |
| T29A | OILA MYERS MYERS T29A |
| T29B | OILA MYERS YABLONSKY T29B |
| T29C | OILA MYERS MYERS T29C |
| T29D | OILA MYERS YABLONSKY T29D |
| T29E | OILA MYERS BORGES T29E |
| T29F | OILA MYERS DELEON T29F |
| T29G | OILA MYERS DELEON T29G |
| T29H | OILA MYERS BORGES T29H |
| T29I | OILA MYERS DELEON T29I |
| T29J | OILA MYERS DELEON T29J |
| T29K | OILA MYERS BORGES T29K |
| T29L | OILA MYERS DELEON T29L |

| ACTIVITY | CLAIM HRS | TICKET HRS | CLAIM/TICKET DELTA | EVENTS |
|---|---|---|---|---|
| JUNE | 32039.5 | 8053.5 | 23986.0 | 7926 |
| MYERS | 32039.5 | 8053.5 | 23986.0 | 7926 |
| ▲ BORGES | 7599.7 | 897.1 | 6702.6 | 901 |
| ▼ DELEON | 8081.1 | 2903.9 | 5577.2 | 2624 |
| ▲ T29F | 1772.2 | 575.6 | 1196.6 | 580 |
| ▲ T29G | 1005.5 | 467.0 | 538.5 | 367 |
| ▲ T29J | 808.5 | 209.2 | 509.3 | 323 |
| ▼ T29L | 702.9 | 205.2 | 497.7 | 167 |
| ▲ 06/22/2001 | 702.9 | 205.2 | 497.7 | 167 |
| ▲ T29M | 1393.0 | 572.4 | 820.6 | 403 |
| ▲ T29N | 1067.0 | 432.8 | 634.2 | 482 |
| ▲ T29S | 670.5 | 30.3 | 640.2 | 44 |
| ▲ T29W | 1061.5 | 321.4 | 740.1 | 290 |
| ▲ MYERS | 1607.6 | 186.3 | 1422.3 | 381 |
| ▲ YABLONSKY | 14351.1 | 4067.2 | 10283.9 | 4100 |
| | 32039.5 | 8053.5 | 23986.0 | 7926 |

METHOD AND SYSTEM FOR VIEWING A RECORD OF AN ORGANIZATION HAVING A HIERARCHY OF DEPARTMENTS

BACKGROUND OF THE INVENTION

1. Technical Field

The present invention generally relates to a method and system for viewing a record of an organization having a hierarchy of departments. More particularly, the present invention provides a method and system for generating a view of the record that includes categorized columns of a hierarchy of departments and an optional identifier.

2. Background Art

As the use of technology in business grows, business organizations are increasingly using computerized methods to track data. One important type of data that is commonly tracked is performance data, which measures the productivity of employees. Once tracked, organizations can analyze the data to improve the efficiency of the business. Tracking such data, however, can be extremely complicated for an organization that includes numerous levels or departments arranged into a hierarchy. Specifically, it is important for the relationship between departments in the hierarchy to be clearly defined so that the effect of one department's performance on another's can be determined. It is also important to be able to track performance data for each department in the hierarchy. This can allow the organization to effectively pinpoint problems and determine the performance of each hierarchical level.

To date, many have attempted to provide computerized organizational tables or charts that set forth the entire hierarchy of an organization. These tables can be used in conjunction with data to create a report or the like depicting the performance data for each department in the hierarchy. Typically, the tables include separate fields for each department. However, manipulated and/or editing such tables raises several problems with respect to both the data and the table. Specifically, in today's business world, departments are constantly being reorganized resulting in changes to the hierarchy. When the hierarchy changes, corresponding changes must be made to the table. Generally, this requires adding or deleting a new field to the table for each department added or eliminated. Moreover, changes to the table require corresponding changes to the agents used to populate the data into a report. Thus, the required changes are complex, time consuming, and costly.

In view of the foregoing, there exists a need for a method and system for viewing a record of an organization having a hierarchy of departments. In addition, a need exists for a method and system to provide a view of the record that has categorized columns of hierarchical levels.

SUMMARY OF THE INVENTION

The present invention overcomes the drawbacks of existing systems by providing a method and system for viewing a record of an organization having a hierarchy of departments. Specifically a record having data, a record department label, and an optional identifier will be received. The received record will be compared to an organizational table having an entry for each department. Each entry includes an organizational department label and a list of hierarchical levels to which the particular department belongs. Based upon this comparison, an entry in the table that corresponds to the record department label is identified. The list of hierarchical levels from the identified entry is then added to the record. Once added, a view of the record is generated that includes categorized columns of the added list of hierarchal departments and the optional identifier.

According to a first aspect of the present invention, a method for viewing a record of an organization having a hierarchy of departments is provided. The method comprises the steps of: (1) receiving a record having a record department label; (2) comparing the record to an organizational table to identify an entry in the organizational table having an organizational department label that matches the record department label; (3) adding a list of hierarchical levels from the identified entry to the record; and (4) generating a view of the record, wherein the view has categorized columns of the added list of hierarchical levels.

According to a second aspect of the present invention, a method for viewing a record of an organization having a hierarchy of departments is provided. The method comprises the steps of: (1) providing an organizational table having an entry for each of the departments, wherein each entry comprises an organizational department label and a list of hierarchical levels; (2) providing a record having a record department label; (3) adding the list of hierarchical levels from an entry in the table corresponding to the record department label to the record; and (4) generating a view of the record, wherein the view includes categorized columns of the added list of hierarchical levels.

According to a third aspect of the present invention, a method for viewing a record of an organization having a hierarchy of departments is provided. The method comprises the steps of: (1) providing an organizational table having an entry for each of the departments, wherein each entry comprises an organizational department label and a list of hierarchical levels; (2) providing a record having an identifier and a record department label; (3) adding the list of hierarchical levels from an entry in the table corresponding to the record department label to the record; and (4) generating a view of the record, wherein the view includes categorized columns of the added list of hierarchical levels and the identifier.

According to a fourth aspect of the present invention, a method for viewing a record of an organization having a hierarchy of departments is provided. The method comprises the steps of: (1) providing an organizational table having an entry for each of the departments, wherein each entry comprises an organizational department label and a list of hierarchical levels; (2) providing a record having an identifier and a record department label; (3) identifying an entry in the organizational table having an organizational department label that corresponds the record department label; (4) adding the list of hierarchical levels from the identified entry to the record; and (5) generating a view of the record, wherein the view includes categorized columns of the added list of hierarchical levels and the identifier.

According to a fifth aspect of the present invention, a system for viewing a record of an organization having a hierarchy of departments is provided. The system comprises: (1) a record system for receiving a record, wherein the record includes a record department label; (2) a cross-reference system for identifying an entry in an organizational table that corresponds to the record department label, and for adding a list of hierarchical levels from the identified entry to the record; and (3) a view system for generating a view of the record, wherein the view includes categorized columns of the added list of hierarchical levels.

According to a sixth aspect of the present invention, a system for viewing a record of an organization having a hierarchy of departments is provided. The system comprises: (1) a record system for receiving a record, wherein the record includes a record department label; (2) a cross-reference system for identifying an entry in an organizational table having an organizational department label that matches the record department label, and for adding a list of hierarchical levels from the identified entry to the record;

and (3) a view system for generating a view of the record, wherein the view includes categorized columns of the added list of hierarchical levels.

According to a seventh aspect of the present invention, a system for viewing a record of an organization having a hierarchy of departments is provided. The system comprises: (1) a record having a record department label and data; (2) an organizational table having an entry for each department, wherein each entry includes an organizational department label and a list of hierarchical levels; (3) a cross-reference system for identifying an entry in the organizational table having an organizational department label that matches the record department label, and for adding the list of hierarchical levels from the identified entry to the record; and (4) a view system for generating a view of the record, wherein the view includes categorized columns of the added list of hierarchical levels.

According to an eighth aspect of the present invention, a program product stored on a recordable medium for viewing a record of an organization having a hierarchy of departments. When executed, the program product comprises: (1) a record system for receiving a record, wherein the record includes a record department label; (2) a cross-reference system for identifying an entry in an organizational table that corresponds to the record department label, and for adding a list of hierarchical levels from the identified entry to the record; and (3) a view system for generating a view of the record, wherein the view includes categorized columns of the added list of hierarchical levels.

According to a ninth aspect of the present invention, a program product stored on a recordable medium for viewing a record of an organization having a hierarchy of departments. When executed, the program product comprises: (1) program code configured to receive a record, wherein the record includes a record department label; (2) program code configured to identify an entry in an organizational table that corresponds to the record department label, and for adding a list of hierarchical levels from the identified entry to the record; and (3) program code configured to generate a view of the record, wherein the view includes categorized columns of the added list of hierarchical levels.

Therefore, the present invention provides a method and system for viewing a record of an organization having a hierarchy of departments.

BRIEF DESCRIPTION OF THE DRAWINGS

These and other features and advantages of this invention will be more readily understood from the following detailed description of the various aspects of the invention taken in conjunction with the accompanying drawings in which:

FIG. 4 depicts an exemplary organizational table according to the present invention.

FIG. 5 depicts an exemplary view according to the present invention.

Figure 1:
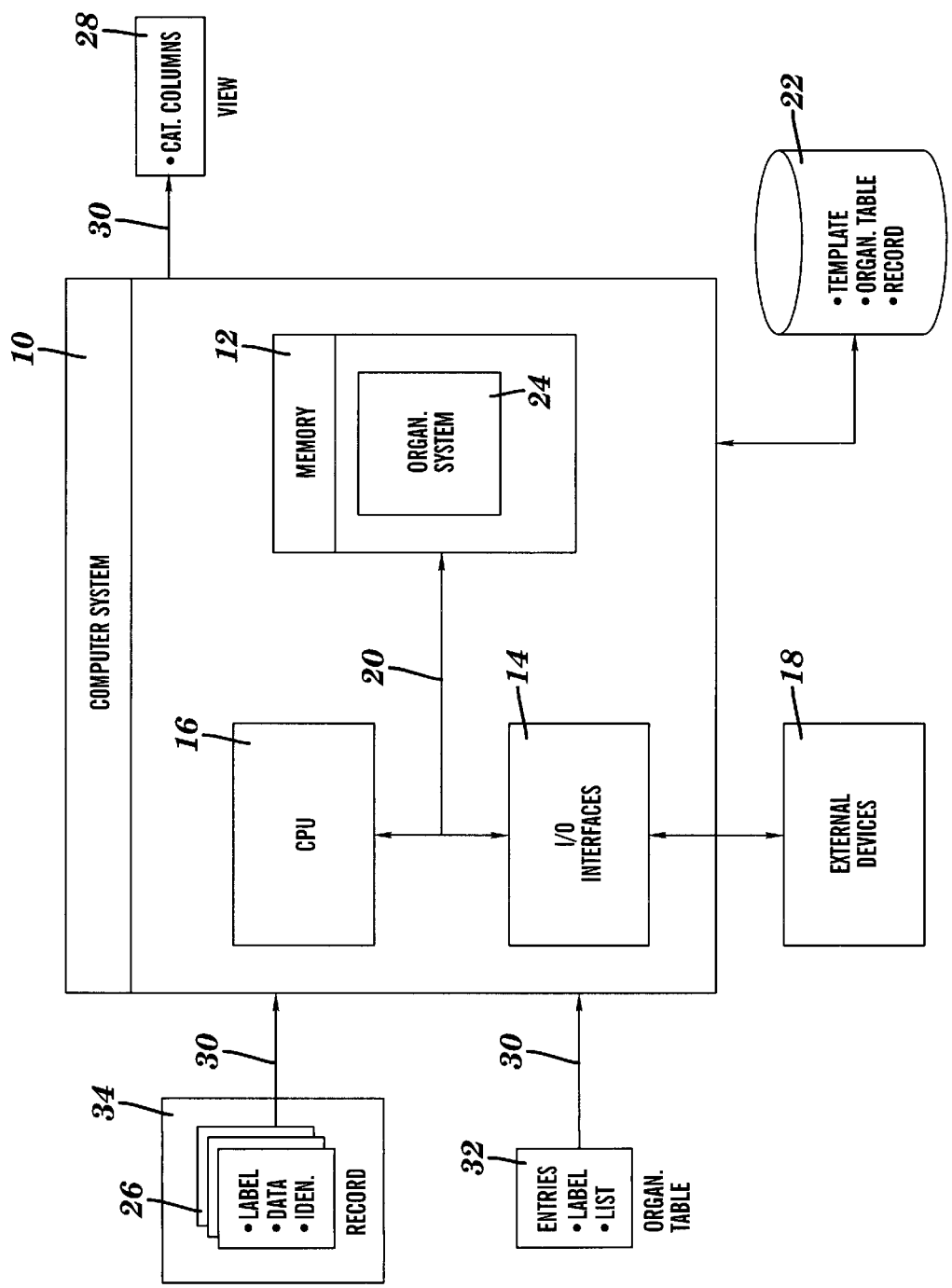
FIG. 1 depicts a computer system having an organization system according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the description will have the following sections:

I. Definitions

II. Computer System

III. Organization System

I. Definitions

Record—a document or the like that includes data, a record department label, and an optional identifier.

Record Department Label—a term, number, symbol, or other mark used to identify the department within an organization to which a record pertains.

Organization Table—a table that includes an entry for each department with each entry including an organizational department label and a list of hierarchical levels.

Organizational Department Label—a term, number, symbol, or other mark used to identify a particular department within an organization.

List of Hierarchical Levels—a list of organizational department labels used to identify a hierarchy for a particular department.

II. Computer System

In general, the present invention provides a method and system for viewing a record of an organization having a hierarchy of departments. Specifically, a record containing data, a record department label, and an optional identifier will be received. The received record will be compared to an organizational table to identify an entry in the table that corresponds to the record department label. Once identified, a list of hierarchical levels from the entry will be added to the record. A view of the record can then be generated that depicts the data and the organization according to categorized columns of the added list of hierarchical levels and the optional identifier. In a preferred embodiment, the present invention is applicable to an organization having a hierarchy of departments. However, it should be understood that the present invention could be applied to any hierarchical (e.g., genus-species) relationship.

Referring now to FIG. 1, a computer system 10 that includes organization system 24 of the present invention is shown. Computer system 10 generally comprises memory 12, input/output interfaces 14, a central processing unit (CPU) 16, external devices/resources 18, bus 20, and database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is organization system 24 (shown in FIG. 1 as a software product). Organization system 24 will be described in more detail below but generally comprises a method and system for displaying a record 26 of an organization 34 having a hierarchy of departments. Specifically, organization system 24 receives record 26 and compares it to organizational table 32 to identify an entry in organizational table 32 that corresponds to a record department label in the record. Once an entry in organizational table 32 is identified, a list of hierarchical levels from the identified entry is added to record 26. View 28 of record 26 is then generated, which includes categorized columns of the added list of hierarchical levels.

Database 22 provides storage for information necessary to carry out the present invention. Such resources could include, inter alia: (1) record(s) 26; (2) templates; and (3) organizational table 32. Database 22 may include one or more storage devices, such as a magnetic disk drive or an optical disk drive. In another preferred embodiment database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Communication with computer system 10 occurs via communication links 30. Communications links 30 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

III. Organization System

Figure 2:
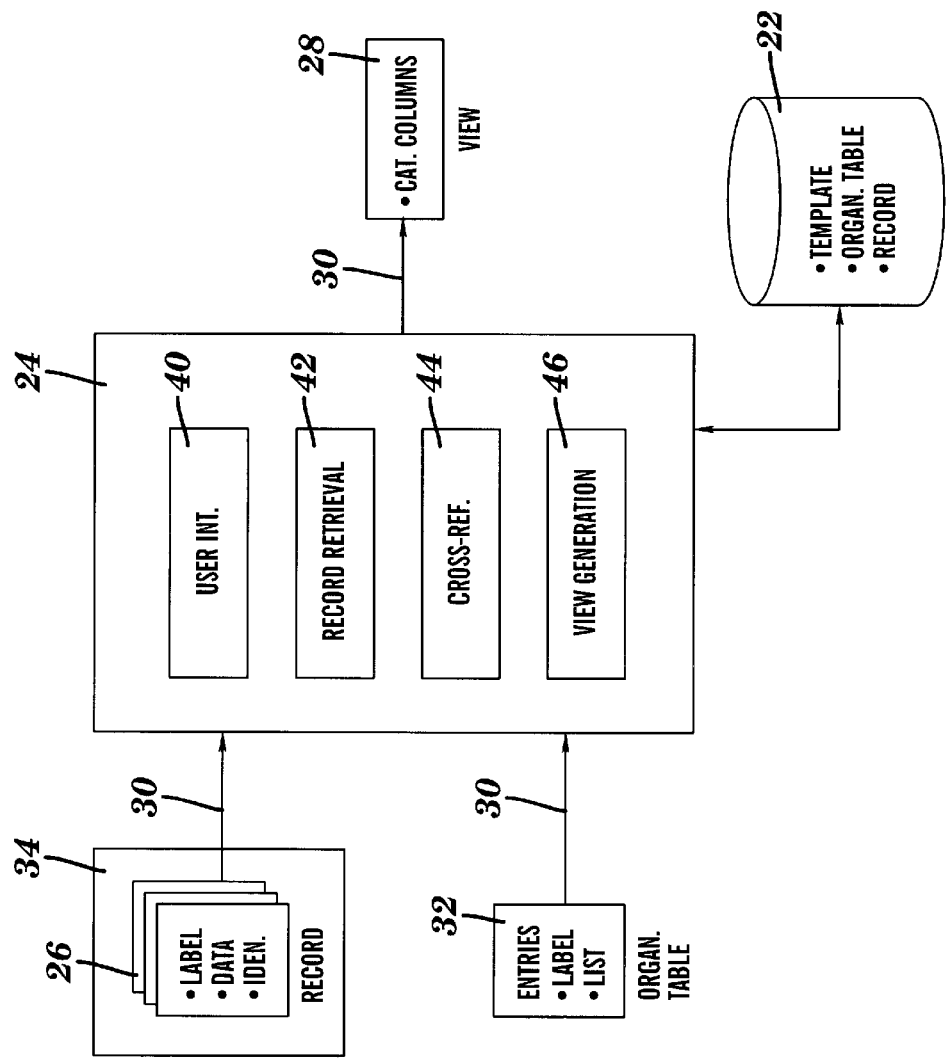
FIG. 2 depicts a box diagram of the organization system of FIG. 1.

Referring now to FIG. 2, organization system 24 is shown in greater detail. As depicted, organization system 24 includes user interface 40, record retrieval system 42, cross-reference system 44, and view generation system 46. Record 26 will be received by record retrieval system 42 from an individual or a department within organization 34. In general, record 26 includes data, a record department label, and an optional identifier. For the purposes of the preferred embodiment, data is performance data that can be used to track the productivity of individuals within organization 34. However, it should be understood that record 26 can contain any type of data. Record department label identifies the department to which the record pertains/belongs. Specifically, if record 26 contains performance data relating to "Joe Smith" in department "T29L," record department label will be "T29L." It should also be appreciated that although each individual record 26 can contain data pertaining to one individual, a record can be created that contains data pertaining to a group of individuals or an entire department.

Figure 3:
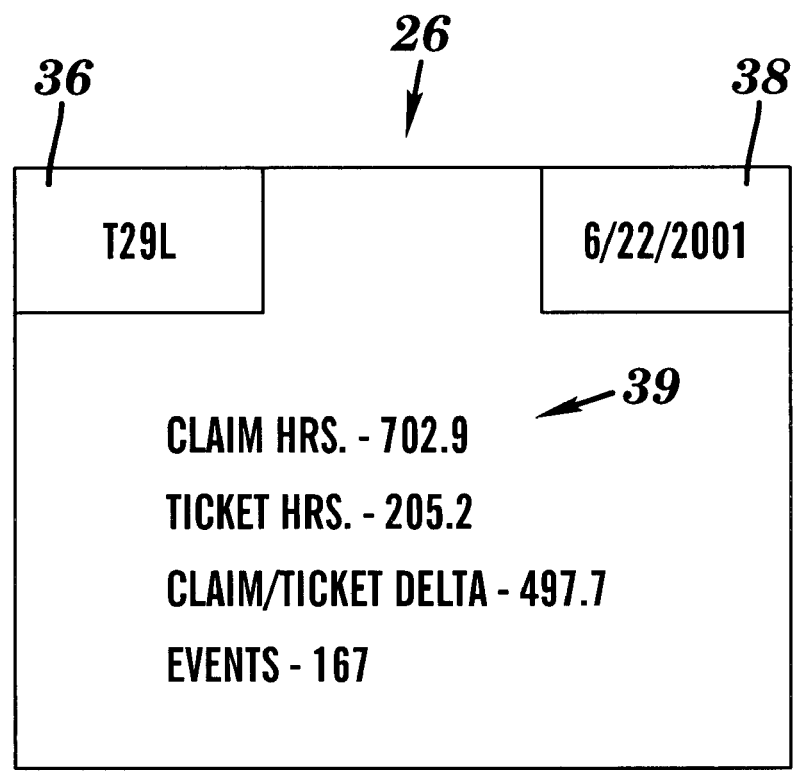
FIG. 3 depicts an exemplary record according to the present invention.

FIG. 3 depicts an exemplary record 26 according to the present invention. As shown, record 26 includes record department label 36, optional identifier 38, and data 39. As indicated above, record department label 36 identifies the department (i.e., "T29L") to which record 26 pertains. Data 39 could be performance data that can be used to track the performance of an individual, group of individuals or an entire department. However, it should be appreciated that data can be of any type. Optional identifier 38 can be used to further distinguish record 26. As shown, identifier 38 is a date stamp. The date stamp can be used to view a record and/or data therefrom for a particular date (as described in further detail below). It should be understood that optional identifier 38 can be any identifier helpful in further distinguishing record 26. For example, optional identifier 38 could be an individual's name (e.g., "Joe Smith"). Once received, record 26 can be stored in database 22 (FIG. 2) for comparison to organization table 32 (described in further detail below).

Referring to FIG. 4, an exemplary depiction of organizational table 32 is shown. Organizational table 32 preferably contains one entry/row 54 for each department in the organization. Each entry 54 preferably includes two fields, department field 50 and organization field 52. For each entry 54, department field 50 includes an organizational department label 56 and organization field 52 includes a list of hierarchical levels 58. Organization department label 56 identifies a particular department in the organization. List of hierarchical levels 58 indicates the complete hierarchy in which the particular department resides/belongs. For example, the hierarchy for department "T29L" 56 includes departments "T29L," "Deleon," "Myers," and "OILA." Accordingly, the hierarchy for department "T29L" is as follows:

OILA

Myers

Deleon

T29L with "T29L" being the bottom department in the hierarchy and "OILA" being the top department. By viewing organizational table 32, the complete hierarchy for every department in the organization can be determined. This gives a complete picture of the interrelationships that exist between each department. By implementing the organizational table as shown, editing the hierarchy is made substantially easier. For example, to add or delete department/departments from the hierarchy requires only revising entries 54 in organizational table 32. In previous systems, a user was forced to add or delete entire fields (e.g., 50 and 52) from the organizational table to make such changes.

Referring back to FIG. 2, cross-reference system 44 will compare record 26 to organizational table 32 to identify an entry in organizational table 32 that corresponds to the record department label in record 26. Specifically, the record department label in record 26 will be compared to the organizational department labels contained in the entries of organizational table 32. A particular entry is identified when a match is established. When this occurs, the list of hierarchical levels from the identified entry is added to record 26. For example, using the record 26 of FIG. 3 and the organizational table 32 of FIG. 4, the record department label 36 "T29L" would be matched against entries 54. This would identify the last entry in FIG. 4, namely, the entry identified by organizational department label 56 "T29L." Once identified, the corresponding list of hierarchical levels 58 from the identified entry (e.g., "OILA," "Myers," "Deleon," and "T29L") would be added to record 26.

It should be appreciated that organizational table 32 can be imported/received from an external source by cross-reference system 44 (as shown in FIG. 2). Alternatively, organizational table 32 can be pre-stored in database 22 and accessed by cross-reference system 44. Moreover, record 26 is preferably imported/received from an external source by record retrieval system 42. However, it should be appreciated that record 26 could also be stored in database 22, and accessed by record retrieval system 42 for comparison by cross-reference system 44.

Once the list of hierarchical levels from the identified entry has been added to record 26, view generation system 46 (FIG. 2) will generate a view 28 of record 26. In a preferred embodiment, view generation system 46 will retrieve a template from database 22 and then generate view 28 by populating the retrieved template using the information in record 26. FIG. 5 shows an exemplary view 28. Specifically, view 28 depicts multiple records (including data 62) according to categorized columns 60 of the added list of hierarchical levels and the optional identifier 38 of FIG. 3. This allows a user to observe records at any department within the entire hierarchy. Specifically, each department and identifier is assigned a separate categorized column 60. For example, for the "Myers"—"Deleon"—"T29L" hierarchy, each department has its own categorized column 70, 72, and 74 in view 28. Moreover, optional identifier "6/22/2001" also has its own categorized column 76.

Record 26 of FIG. 3 is depicted in view entry 64. As shown, department "T29L" performed 702.0 claims hours, 205.2 ticket hours, 497.7 claim/ticket delta and 167 events for the week ending Jun. 22, 2001. This system of providing categorized columns of the list of hierarchical levels and the optional identifier allows a user to manipulate view 28 (via user interface 40 of FIG. 2) to observe performance at any department (e.g., department, date, individual, etc.). Preferably, manipulation occurs by expanding or contracting the categorized columns to the desired department by selecting the corresponding indicia 78. For example, by expanding the categorized columns 60 in this manner, a user can observe performance for department "Deleon" and all departments thereunder (e.g., "T29F," "T29G," "T29J," "T29L," "T29M," "T29N," "T29S," and "T29W"). For these departments, a total of 8,081.1 claims hours, 2,903.9 ticket hours, 5,577.2 claim/ticket delta, and 2,624 events occurred during the month of June. Thus, by implementing view 28 as shown, a user is provided with optimal manipulation capabilities over features such as dates, departments, and individuals within departments.

Figure 6:
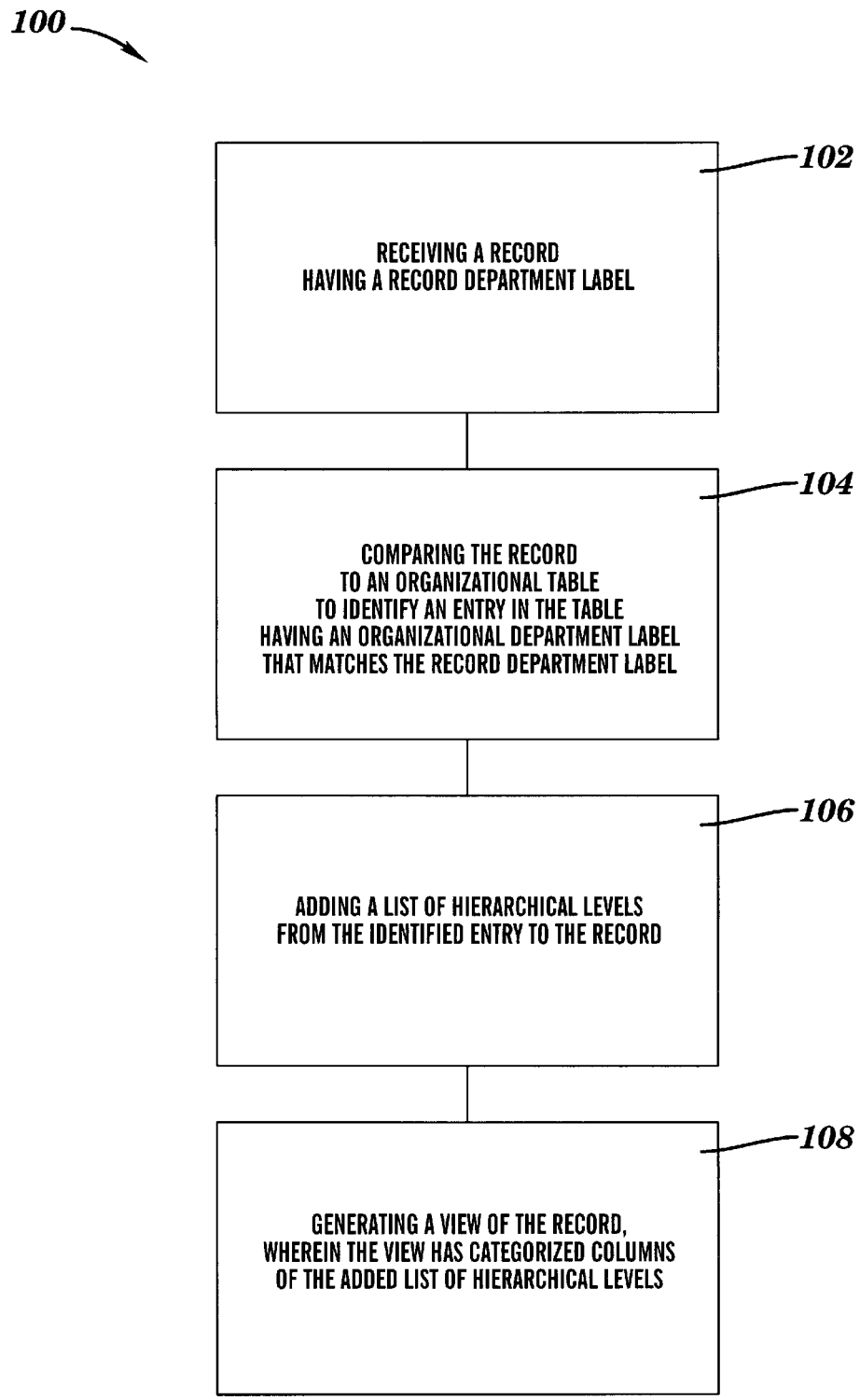
FIG. 6 depicts a method flow chart according to the present invention.

Referring now to FIG. 6, a method 100 according to the present invention is shown. First step 102 in method is to receive a record having a record department label. Second step 104 is to compare the record to an organizational table to identify an entry in the organizational table having an organizational department label that matches the record department label. Third step 106 is to add a list of hierarchical levels from the identified entry to the record. Fourth step 108 of method 100 is to generate a view of the record, wherein the view has categorized columns of the added list of hierarchical levels.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the various functions of the organizations system 24 (as explained in conjunction with FIG. 2) could be performed by a different quantity of sub-systems than depicted.

What is claimed is:

1. A computerized method for viewing a record of an organization having a hierarchy of departments, comprising the steps of:

receiving a record having a record department label into a memory;

comparing the record to an organizational table that is separate from the record to identify an entry in the organizational table having an organizational department label that matches the record department label;

copying a list of hierarchical levels from the identified entry to the record; and generating a view of the record, wherein the view has categorized columns of the added list of hierarchical levels.

2. The method of claim 1, further comprising the step of providing an organizational table having an entry for each of the departments.

3. The method of claim 2, wherein each entry includes an organizational department label and a list of hierarchical levels.

4. The method of claim 1, wherein the record further includes data.

5. The method of claim 4, wherein the step of generating a view further comprises the step of depicting the data according to the categorized columns.

6. The method of claim 1, wherein the comparing step comprises the steps of:

accessing an organizational table having an entry for each department, wherein each entry includes an organizational department label and a list of hierarchical levels; and comparing the record to the organizational table to identify an entry having an organizational department label that matches the record department label.

7. A computerized method for viewing a record of an organization having a hierarchy of departments, comprising the steps of:

providing an organizational table having an entry for each of the departments, wherein each entry comprises an organizational department label and an organization field that includes a list of hierarchical levels;

providing a record, stored in a memory, having a record department label;

adding the list of hierarchical levels from an entry in the table corresponding to the record department label to the record; and generating a view of the record, wherein the view includes categorized columns of the added list of hierarchical levels.

8. The method of claim 7, wherein the record further has data.

9. The method of claim 8, wherein the step of generating a view of the record further comprises the step of depicting the data according to the categorized columns.

10. The method of claim 7, further comprising the step of comparing the record to the organizational table to identify an entry in the organizational table having an organizational department label that matches the record department label, prior to the adding step.

11. A computerized method for viewing a record of an organization having a hierarchy of departments, comprising the steps of:
provide an organizational table, stored in a memory, having an entry for each of the departments, wherein each entry comprises an organizational department label and a list of hierarchical levels;
providing a record, stored in the memory, having an identifier and a record department label;
adding the list of hierarchical levels from an entry in the table corresponding to the record department label to the record; and
generating a view of the record, wherein the view includes categorized columns of the added list of hierarchical levels and the identifier.

12. The method of claim 11, further comprising the step of comparing the record to the organizational table to identify an entry having an organizational label that matches the record label.

13. The method of claim 11, wherein the record further comprises data.

14. The method of claim 13, wherein the generating step further comprises the step of depicting the data according to the categorized columns.

15. A computerized method for viewing a record of an organization having a hierarchy of departments, comprising the steps of:
providing an organizational table, stored in a memory, having an entry for each of the departments, wherein each entry comprises an organizational department label and an organization field that includes a list of hierarchical levels;
providing a record, stored in the memory, having an identifier and a record department label;
identifying an entry in the organizational table having an organizational department label that corresponds the record department label;
adding the list of hierarchical levels from the identified entry to the record; and
generating a view of the record, wherein the view includes categorized columns of the added list of hierarchical levels and the identifier.

16. A computerized system for viewing a record of an organization having a hierarchy of departments, comprising:
a record system for receiving a record into a memory, wherein the record includes a record department label;
a cross-reference system for identifying an entry in an organizational table that corresponds to the record department label, and for adding a list of hierarchical levels from the identified entry to the record; and
a view system for generating a view of the record, wherein the view includes categorized columns of the added list of hierarchical levels.

17. The system of claim 16, wherein the record further includes data.

18. The system of claim 17, wherein the view depicts the data according to the categorized columns.

19. The system of claim 16, wherein the cross-reference system compares the organizational table to the record to identify an entry having an organizational department label that matches the record department label.

20. The system of claim 16, wherein the organizational table comprises an entry for each department, and wherein each entry comprises an organizational department label and a list of hierarchical levels.

21. The system of claim 16 further comprising a user interface for manipulating the view.

22. A computerized system for viewing a record of an organization having a hierarchy of departments, comprising:
a record system for receiving a record into a memory, wherein the record includes a record department label;
a cross-reference system for identifying an entry in an organizational table having an organizational department label that matches the record department label, and for adding a list of hierarchical levels included in an organization field in the identified entry to the record; and
a view system for generating a view of the record, wherein the view includes categorized columns of the added list of hierarchical levels.

23. The system of claim 22, wherein the record further includes data.

24. The system of claim 23, wherein the view depicts the data according to the categorized columns.

25. The system of claim 22, wherein the organizational table comprises an entry for each department, and wherein each entry comprises an organizational department label and a list of hierarchical levels.

26. The system of claim 22, farther comprising a user interface for manipulating the view.

27. A computerized system for viewing a record of an organization having a hierarchy of departments, comprising:
a record having a record department label and data, wherein the record is stored in a memory;
an organizational table that is separate from the record and having an entry for each department, wherein each entry includes an organizational department label and a list of hierarchical levels;
a cross-reference system for identifying an entry in the organizational table having an organizational department label that matches the record department label, and for copying the list of hierarchical levels from the identified entry to the record; and
a view system for generating a view of the record, wherein the view includes categorized columns of the added list of hierarchical levels.

28. The system of claim 27, wherein the view depicts the data according to the categorized columns.

29. The system of claim 27, further comprising a user interface for manipulating the view.

30. A program product stored on a recordable medium for viewing a record of an organization having a hierarchy of departments, which when executed, comprises:
a record system for receiving a record, wherein the record includes a record department label;
a cross-reference system for identifying an entry in an organizational table that corresponds to the record department label, and for copying a list of hierarchical levels from the identified entry to the record; and
a view system for generating a view of the record, wherein the view includes categorized columns of the added list of hierarchical levels.

31. The program product of claim 30, wherein the record further includes data, and wherein the view depicts the data according to the categorized columns.

32. The program product of claim 30, wherein the cross-reference system compares the organizational table to the record to identify an entry having an organizational department label that matches the record department label.

33. The program product of claim 30, wherein the organizational cable comprises an entry for each department, and wherein each entry comprises an organizational department label and a list of hierarchical levels.

34. A program product stored on a recordable medium for viewing a record of an organization having a hierarchy of departments, which when executed, comprises:

program code configured to receive a record, wherein the record includes a record department label;

program code configured to identify an entry in an organizational table that corresponds to the record department label, and for adding a list of hierarchical levels included in an organization field in the identified entry to the record; and program code configured to generate a view of the record, wherein the view includes categorized columns of the added list of hierarchical levels.

* * * * *